United States Patent
Jung et al.

(10) Patent No.: US 9,462,483 B2
(45) Date of Patent: Oct. 4, 2016

(54) POWER-EFFICIENT CHANNEL QUALITY MEASURING METHOD IN A MOBILE COMMUNICATION SYSTEM IN WHICH CARRIER AGGREGATION IS EMPLOYED, AND A DEVICE FOR THE SAME

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/521,031

(22) PCT Filed: Jan. 6, 2011

(86) PCT No.: PCT/KR2011/000077
§ 371 (c)(1),
(2), (4) Date: Jul. 6, 2012

(87) PCT Pub. No.: WO2011/083982
PCT Pub. Date: Jul. 14, 2011

(65) Prior Publication Data
US 2013/0128754 A1    May 23, 2013

Related U.S. Application Data

(60) Provisional application No. 61/293,185, filed on Jan. 7, 2010, provisional application No. 61/321,112, filed on Apr. 5, 2010.

(51) Int. Cl.
*H04W 24/00* (2009.01)
*H04W 24/10* (2009.01)
*H04W 52/02* (2009.01)

(52) U.S. Cl.
CPC ............. *H04W 24/00* (2013.01); *H04W 24/10* (2013.01); *H04W 52/02* (2013.01); *Y02B 60/50* (2013.01)

(58) Field of Classification Search
CPC .... H04W 24/10; H04W 36/24; H04W 36/30
See application file for complete search history.

(56) References Cited

U.S. PATENT DOCUMENTS

| | | | |
|---|---|---|---|
| 2007/0004445 A1 | 1/2007 | Dorsey et al. | |
| 2007/0270148 A1* | 11/2007 | Yeh et al. | 455/436 |
| 2008/0039094 A1* | 2/2008 | Jeong et al. | 455/436 |
| 2008/0220784 A1* | 9/2008 | Somasundaram | H04W 36/0083 455/437 |
| 2009/0316659 A1* | 12/2009 | Lindoff et al. | 370/332 |
| 2010/0222060 A1* | 9/2010 | Zhang et al. | 455/436 |
| 2013/0051214 A1* | 2/2013 | Fong et al. | 370/216 |

FOREIGN PATENT DOCUMENTS

| | | |
|---|---|---|
| KR | 10-2007-0006539 | 1/2007 |
| KR | 10-2009-0034261 | 4/2009 |

\* cited by examiner

*Primary Examiner* — Huy D Vu
*Assistant Examiner* — James P Duffy
(74) *Attorney, Agent, or Firm* — Lee, Hong, Degerman, Kang & Waimey

(57) ABSTRACT

The present invention relates to a method in which a terminal carries out channel quality measurement in a power-efficient fashion in a mobile communication system in which carrier aggregation is employed. If the terminal supports measurement based on serving cell quality, then an additional judgment is made as to whether the terminal is configured for simultaneous communication with a plurality of serving cells and, if the terminal does support measurement based on serving cell quality and is configured for simultaneous communication with a plurality of serving cells, then a decision is made as to whether the quality-representing value for the plurality of serving cells is at or above a threshold value and, if the quality-representing value for the plurality of serving cells is at or above the threshold value, then a quality measurement is carried out within a limited range taking into account the plurality of serving cells.

12 Claims, 14 Drawing Sheets

POWER-EFFICIENT CHANNEL QUALITY MEASURING METHOD IN A MOBILE COMMUNICATION SYSTEM IN WHICH CARRIER AGGREGATION IS EMPLOYED, AND A DEVICE FOR THE SAME

CROSS-REFERENCE TO RELATED APPLICATIONS

This application is the National Stage filing under 35 U.S.C. 371 of International Application No. PCT/KR2011/000077, filed on Jan. 6, 2011, which claims the benefit of U.S. Provisional Application Ser. No. 61/293,185, filed on Jan. 7, 2010, and U.S. Provisional Application Ser. No. 61/321,112, filed on Apr. 5, 2010, the contents of which are all incorporated by reference herein in their entirety.

TECHNICAL FIELD

The present invention relates to a method for a user equipment to perform a power-efficient channel quality measurement in carrier aggregation applied mobile communication system and a user equipment device for the same.

BACKGROUND ART

In a mobile communication system, supporting mobility of a user equipment is mandatory. To this end, the user equipment continuously measures a quality of a serving cell currently providing a service and a quality of a neighboring cell. The user equipment reports a measurement result to a network at a proper time and the network then provides optimal mobility to the user equipment via handover and the like.

In order to provide information for helping a service provider operate the network as well as the mobility support, the user equipment performs a measurement for the specific purpose set up by the network and may be then able to report the corresponding measurement result to the network. For instance, the user equipment may receive broadcast information of a specific cell determined by the network. Based on the received broadcast information, the user equipment is able to report a cell identity (called a global cell identity) of the specific cell, location identification information (e.g., tracking area code) on a location to which the specific cell belongs, and other cell information (e.g., a presence or non-presence of membership in CSG (closed subscriber group) cell) to a serving cell.

While a user equipment is moving, if the user equipment confirms that a quality of a specific area is very poor via measurement, it may able to report location information on cells having poor quality and a measurement result to a network. Based on the report on the measurement results of user equipments helping the operation of the network, optimization of the network can be enhanced.

In a mobile communication system having a frequency reuse factor set to 1. mobility is mostly performed between different cells on the same frequency band. Hence, in order to secure good mobility of a user equipment, the user equipment needs to measure quality of neighbor cells having center frequency equal to that of a serving cell and cell information well. Thus, the measurement of a cell having a center frequency equal to that of a serving cell is called intra-frequency measurement. A user equipment performs intra-frequency measurement and then reports a result of the measurement to a network at a proper time, whereby the object of the corresponding measurement result can be achieved.

A mobile communication service provider may operate a network using a plurality of frequency bands. In case that a service of a communication system is provided on a plurality of frequency bands, in order to secure optimal mobility of a user equipment, the user equipment should be able to well measure qualities of neighbor cells having center frequency different from that of a serving cell and cell information. Thus, the measurement of a cell having a center frequency different from that of a serving cell is called inter-frequency measurement. A user equipment performs inter-frequency measurement and then reports a result of the measurement to a network at a proper time.

When a user equipment supports measurement of a heterogeneous network, the user equipment may be able to perform measurement on the heterogeneous network in accordance with a base station configuration. This measurement of the heterogeneous network is called inter-RAT (inter-radio access technology) measurement. For instance, RAT may include UTRAN (UMTS terrestrial radio access network) and GERAN (GSM EDGE radio access network) according to 3GPP Standard Specifications or may include CDMA 2000 system according to 3GPP2 Standard Specifications.

However, if a user equipment performs all the intra-frequency measurement, the inter-frequency measurement and the inter-RAT measurement, as mentioned in the foregoing description, it may cause a problem of power consumption of the user equipment. In particular, in case that carrier aggregation introduced by 3GPP LTE-A Standard is applied, since the user equipment may be able to communicate with a plurality of serving cells at the same time, the demand for a power-efficient measurement performing method is rising.

DISCLOSURE OF THE INVENTION

Technical Tasks

Accordingly, the present invention is directed to substantially obviate one or more problems due to limitations and disadvantages of the related art. First of all, an object of the present invention is to provide a method of performing a channel quality measurement in a mobile communication system using carrier aggregation and user equipment device for the same, by which a channel quality can be power-efficiently performed.

TECHNICAL SOLUTION

To achieve these and other advantages and in accordance with the purpose of the present invention, as embodied and broadly described, a method of performing power-efficiently a channel quality measurement operation at a user equipment in a mobile communication system using carrier aggregation, according to one embodiment of the present invention may include the steps of receiving a measurement configuration information from a network, determining whether the user equipment supports a serving cell quality criterion measurement scheme via the received measurement configuration information, if the user equipment supports the serving cell quality criterion measurement scheme, determining whether the user equipment is configured to communicate with a plurality of serving cells simultaneously, if the user equipment supports the serving cell quality criterion measurement scheme and is configured to communicate with a plurality of the serving cells simultaneously, determining whether a quality representative value of a plurality of the serving cells is equal to or greater than a threshold, and if the quality representative value of the plurality of the serving cells is equal to or greater than the threshold, performing a quality measurement within a restricted range in consideration of the plurality of the serving cells.

Preferably, the used equipment may include a measurement object list information, a measurement reporting configuration list information and a measurement identity information for connecting a measurement object in the measurement object list and a reporting configuration in the measurement reporting configuration list. And, if the quality representative value of the plurality of the serving cells is smaller than the threshold, the method further include the step of performing the quality measurement of all measurement objects in the measurement object list.

Preferably, the quality representative value of the plurality of the serving cells may include a quality value of a cell used by the user equipment for system information acquisition among a plurality of the serving cells, a quality value of a cell providing an input parameter related to a security configuration among a plurality of the serving cells, a quality value of a cell becoming a criterion of determining a presence or non-presence of discontinuous reception (DRX) operation among the plurality of the serving cells, a quality value of a cell having a poorest channel quality among a plurality of the serving cells, and a quality value of a cell having a best channel quality among the plurality of the serving cells. And, each of these cells may be named Primary Cell or PCell.

Preferably, assuming that quality values of the plurality of the serving cells are set to $Q_1$ to $Q_N$. respectively, the quality representative value of the plurality of the serving cells may be determined as '$W_1*Q_1+W_2*Q_2+ \ldots +W_N*Q_N$', where '$W_1+W_2+ \ldots +W_N=1$' and '$W_1, W_2, \ldots W_N \geq 0$'.

Preferably, the quality measurement within the restricted range in consideration of the plurality of the serving cells may be performed by at least one of a first combination including the plurality of the serving cells and a second combination including neighbor cells within a frequency that a plurality of the serving cells exist thereon.

Preferably, the quality measurement within the restricted range in consideration of the plurality of the serving cells may be performed by at least one of a first combination including at least one specific cell among a plurality of the serving cells and a second combination including neighbor cells within a frequency that the specific cell exist thereon and the specific cell may include at least one of a cell used by the user equipment for system information acquisition, a cell providing an input parameter related to a security configuration of the user equipment and a cell becoming a criterion of a determination of a presence or non-presence of DRX operation of the user equipment.

To further achieve these and other advantages and in accordance with the purpose of the present invention, a user equipment, which performs a channel quality measurement operation power-efficiently in a mobile communication system using carrier aggregation, according to one embodiment of the present invention may include a receiving module configured to receive a measurement configuration information from a network and a processor configured to control a channel quality measurement operation using the measurement configuration information received via the receiving module, the processor, if the user equipment supports a serving cell quality criterion measurement scheme and is configured to communicate with the plurality of the serving cells simultaneously, is configured to determine whether a quality representative value of the plurality of the serving cells is equal to or greater than a threshold, the processor, if the quality representative value of a plurality of the serving cells is equal to or greater than the threshold, is configured to perform a quality measurement within a restricted range in consideration of the plurality of the serving cells.

Preferably, the user equipment may further include a memory configured to store a measurement object list information, a measurement reporting configuration list information and a measurement identity information for connecting a measurement object in the measurement object list and a reporting configuration in the measurement reporting configuration list. And, if the quality representative value of the plurality of the serving cells is smaller than the threshold, the processor may be configured to control performing quality measurement of all measurement objects in the measurement object list.

Advantageous Effects

According to the above-mentioned embodiments of the present invention, a user equipment performs a channel quality measurement power-efficiently in a mobile communication system using carrier aggregation, thereby minimizing power loss of the user equipment without affecting a mobility control of the user equipment.

MODE FOR INVENTION

Reference will now be made in detail to the preferred embodiments of the present invention, examples of which are illustrated in the accompanying drawings. The detailed description disclosed together with the accompanying drawings intends to explain exemplary embodiments of the present invention instead of representing a unique embodiment of the present invention. For instance, although the following descriptions are made in detail on the assumption that a mobile communication system includes 3GPP LTE based system, the following descriptions are variously applicable as a method for a user equipment to perform transmission-efficient measurement in various kinds of mobile communication systems such as IEEE 802.16 based systems and the like to which carrier aggregation technology is applicable.

The following detailed description of the invention includes details to help the full understanding of the present invention. Yet, it is apparent to those skilled in the art that the present invention can be implemented without these details. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

As mentioned in the foregoing description, a method for a user equipment to perform a channel quality measurement power-efficiently in a mobile communication system using carrier aggregation and a user equipment device for the same are explained as follows. To this end, 3GPP LTE system is schematically described as one example of a mobile communication system to apply this technology thereto.

Figure 1:
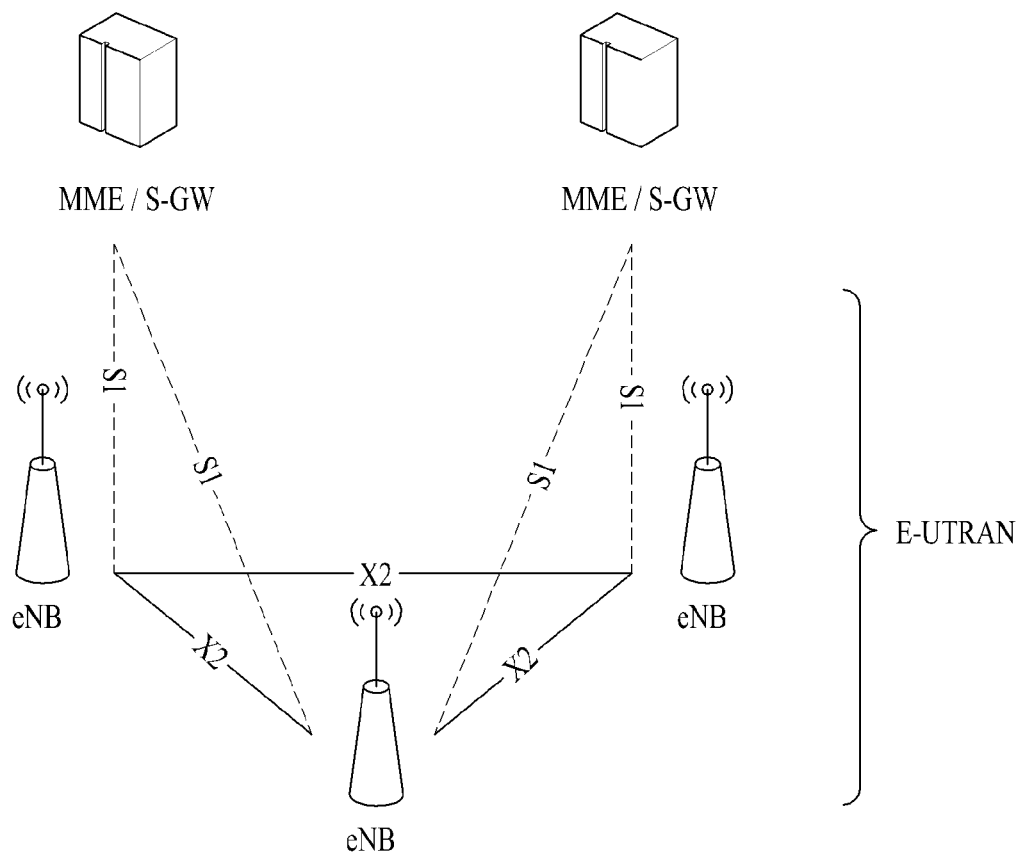
FIG. 1 is a diagram of a network structure of E-UTRAN (evolved universal terrestrial radio access network) for example of a mobile communication system.

FIG. 1 is a diagram of a network structure of E-UTRAN (evolved universal terrestrial radio access network) for example of a mobile communication system. E-UTRAN (evolved universal terrestrial radio access network) is the system evolved from the conventional UTRAN and its basic standardization is in progress by 3GPP. The E-UTRAN system is called LTE (long term evolution) system.

The E-UTRAN includes eNBs (e-NodeBs or base stations). The eNBs are connected to each other via X2 interface. The eNB is connected with a user equipment (hereinafter abbreviated UE) via wireless interface and is connected to EPC (evolved packet core) via S1 interface.

The EPC may include a mobility management entity (hereinafter abbreviated MME), a serving-gateway (hereinafter abbreviated S-GW), and a packet data network-gateway (hereinafter abbreviated PDN-GW). The MME has access information of the UE or information on capability of the UE. Such information is mainly used for the mobility management of the UE. The S-GW is a gateway having the E-UTRAN as a terminal end point. And, the PDN-GW is a gateway having the PDN as a terminal end point.

Layers of a radio interface protocol between a user equipment and a network may be divided into L1 ($1^{st}$ layer), L2 ($2^{nd}$ layer) and L3 ($3^{rd}$ layer) based on 3 lower layers of an open system interconnection (OSI) reference model widely known to the communication system. In these layers, a physical layer belonging to the $1^{st}$ layer provides an information transfer service using a physical channel and a radio resource control (hereinafter abbreviated RRC) situated in the $3^{rd}$ layer plays a role in controlling radio resources between the user equipment and the network. For this, the RRC layer plays a role in exchanging RRC message between a user equipment and a base station.

Figure 2:
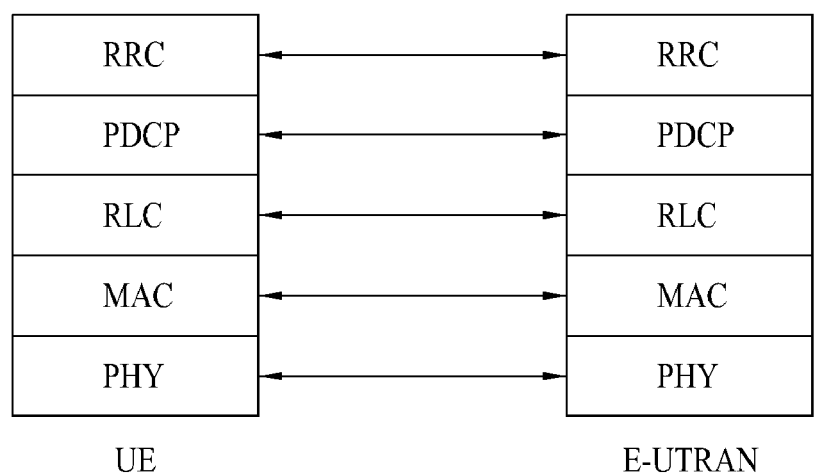
FIG. 2 and FIG. 3 are diagrams of structures of a radio interface protocol between UE (user equipment) and E-UTRAN based on 3GPP radio access network specifications.
Figure 3:
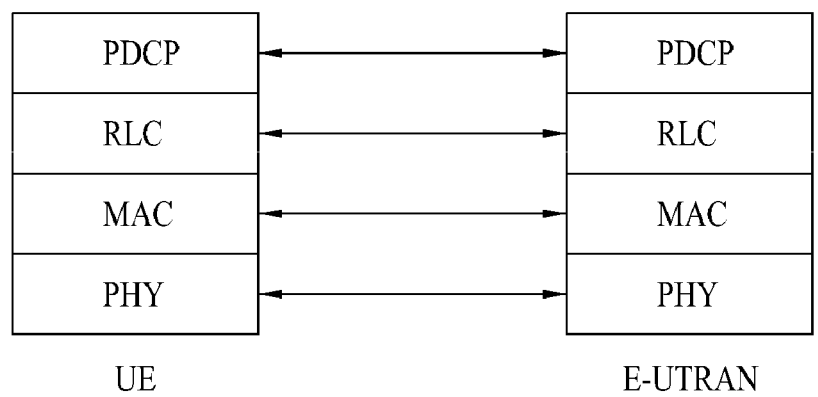

FIG. 2 and FIG. 3 show structures of a radio interface protocol between UE and E-UTRAN based on 3GPP radio access network specifications, respectively.

A radio interface protocol is horizontally constructed with a physical layer, a data link layer and a network layer. And, the radio interface protocol can be vertically divided into a user plane (hereinafter abbreviated U-plane) for a data information transfer and a control plane (hereinafter abbreviated C-plane) for a delivery of a control signal (i.e., signaling). The protocol layers shown in FIG. 2 or FIG. 3 can be divided into a first layer L1. a second layer L2 and a third layer L3 based on three lower layers of OSI (open system interconnection) reference model widely known to the communication systems. The radio protocol layers exist as pairs in UE and E-UTRAN and are responsible for the data transfer in a radio section.

In the following description, the layers of the radio protocol control plane shown in FIG. 2 and the layers of the radio protocol user plane shown in FIG. 3 are explained.

First of all, a physical layer of the first layer provides an information transfer service to an upper layer using a physical channel. The physical layer is connected to a medium access control (MAC) layer above the physical layer via a transport channel. And, data is transferred between the medium access control layer and the physical layer through the transport channel. Data is transferred between different physical layers, and more particularly, between a physical layer of a transmitting side and a physical layer of a receiving side. The physical layer is modulated by OFDM (orthogonal frequency division multiplexing) scheme and utilizes time and frequency as radio resources.

A medium access control (hereinafter abbreviated MAC) of the second layer provides a service to a radio link control layer, which is an upper layer, via a logical channel. The radio link control layer (hereinafter abbreviated RLC) of the second layer supports a reliable data transport. And, a function of the RLC layer can be implemented with a function block within the MAC layer. In this case, the RLC layer may not exist. A PDCP layer of the second layer performs a header compression function for reducing an IP packet header size, which is relatively big and carries unnecessary control information, to efficiently transmit such an IP packet as IPv4. IPv6 and the like in a radio section having a narrow bandwidth.

A radio resource control (hereinafter abbreviated RRC) layer situated at the top of the third layer is defined in a control plane only. The RRC layer is responsible for controlling logical channels, transport channels and physical channels in association with configuration, reconfiguration and release of radio bearers (hereinafter abbreviated RBs). In this case, the RB means a service provided by the second layer for the data delivery between the UE and the E-UTRAN. In case that an RRC connection is established between the RRC layer of the UE and the RRC layer of the E-UTRAN, the UE is in an RRC connected sate (RRC_CONNECTED). Otherwise, the UE is in an RRC idle state (RRC_IDLE).

Downlink transport channels for transporting data to a user equipment from a network may include a broadcast channel (BCH) for transporting system information and a downlink shared channel (SCH) for transmitting user traffic, control message and/or the like. Traffic or control message of a downlink multicast or broadcast service may be transmitted on the downlink SCH or a separate downlink multicast channel (MCH). Meanwhile, uplink transport channels for transporting data to a network from a user equipment may include a random access channel (RACH) for transmitting an initial control message and an uplink shared channel (SCH) for transmitting user traffic, control message and/or the like.

Logical channel, which is situated above the transport channel to be mapped thereto, may include one of BCCH (Broadcast Channel), PCCH (Paging Control Channel), CCCH (Common Control Channel), MCCH (Multicast Control Channel), MTCH (Multicast Traffic Channel) and the like.

Physical channel consists of several subframes on time axis and several subcarriers on frequency axis. In particular, one subframe consists of a plurality of symbols on time axis. One subframe consists of a plurality of resource blocks. And, one resource block consists of a plurality of symbols and a plurality of subcarriers. Each subframe may be able to use specific subcarriers of specific symbols (e.g., $1^{st}$ symbol) of a corresponding subframe for PDCCH (physical downlink control channel) i.e., L1/L2 control channel. On subframe may consist of 2 slots each of which has a length of 0.5 ms, which may amount to 1 ms corresponding to TTI (transmission time interval) as a unit time for transmitting data.

System information is described as follows. First of all, system information includes mandatory information that a user equipment should know to access a base station. Hence, the user equipment should receive all system information before accessing the base station and should have latest system information all the time. Since the system information is the information that all user equipments within one cell should know, the base station periodically transmits the system information.

The system information may be divided into MIB, SB, SIB and the like. The MIB (master information block) enables a user equipment to know a physical configuration (e.g., bandwidth, etc.) of a corresponding cell. The SB (scheduling block) indicates transmission information of SIBs, e.g., transmission period and the like. The SIB (system information block) is a set of system informations associated with each other. For instance, one SIB contains information of a neighbor cell only and another SIB contains information on an uplink radio channel used by a user equipment only.

Meanwhile, services provided to a user equipment by a network may be classified into three kinds of types. In accordance with what kind of service can be provided, a user equipment recognizes a cell type differently as well. IN the following description, service types and cell types are explained in turn.

1) Limited service: This service provides an emergency call and ETWS and may be provided in acceptable cell.

2) Normal service: This service means a universal service for a public use and may be provided in a suitable cell.

3) Operator service: This service means a service for a communication network service provider. This cell is available for the communication network service provider only. This cell is not available for general users.

In association with a service type provided by a cell, a type of cell may be classified as follows.

1) Acceptable cell: A user equipment can be provided with a limited service by this cell. In aspect of a corresponding user equipment, this cell satisfies a cell selection reference of the user equipment without being barred.

2) Suitable cell: A user equipment can be provided with a normal service. This cell satisfies a condition of an acceptable cell and also additional conditions. According to the additional conditions, this cell should belong to PLMN that can be accessed by a corresponding user equipment and a user equipment is not restricted from performing a tracking area update procedure. If a corresponding cell is a CSG cell, a user equipment should be able to access this cell as a CSG member.

3) Barred cell: This cell broadcasts information called a bared cell via system information.

4) Reserved cell: This cell broadcasts information called a reserved cell via system information.

In the following description, an RRC state of a user equipment and an RRC connection method are explained. First of all, the RRC state means whether an RRC of a user equipment has a logical connection with an RRC of E-UTRAN. If the RRCs are connected with each other, it is called RRC_CONNECTED state. If the RRCs are not connected with each other, it is called RRC_IDLE state. Since RRC connection exists in a user equipment in RRC_CONNECTED state, E-UTRAN is able to recognize a presence of the corresponding user equipment. Hence, the E-UTRAN is able to effectively control the user equipment. On the contrary, E-UTRAN is unable to recognize a user equipment in RRC_IDLE state. And, this user equipment is managed by a core network by a tracking area unit which is a unit of an area larger than a cell. In particular, a presence or non-presence of a user equipment in RRC_IDLE state is recognizable by a larger area unit and should enter RRC_CONNECTED state to receive such a general mobile communication service as a voice service and a data service.

When a user of a user equipment initially turns on a power of the user equipment, the user equipment searches for a suitable cell and then stays in RRC_IDLE state in the corresponding cell. If the user equipment staying in the RRC_IDLE state needs to establish an RRC connection, it establishes the RRC connection with an RRC of E-UTRAN by RRC connection procedure and then enters RRC_CONNECTED state. The user equipment in the idle state may need to establish an RRC connection due to the following reasons. First of all, an uplink data transmission is necessary due to a user's call attempt and the like. Secondly, if a paging message is received from E-UTRAN, it is necessary to send a response message in response to the received paging message.

NAS (non-access stratum) layer situated above RRC layer performs such a function as a session management and a mobility management and the like.

In order for the NAS layer to manage mobility of a user equipment, two kinds of states EMM-REGISTERED (EPS mobility Management-REGISTERED) and EMM-DEREGISTERED. Theses two states may apply to a user equipment and an MME. A user equipment in an early stage is in RMM-DEREGISTERED state. In order to access a network, this user equipment performs a process for registering with the corresponding network via an initial attach procedure. If the attach procedure is successfully completed, the user equipment and the MME are in EMM-REGISTERED states.

In order to manage a signaling connection between a user equipment and an EPC, two kinds of states ECM-IDLE (EPS connection management) and ECM-CONNECTED are defined. These two states may apply to a user equipment and an MME. If a user equipment in ECM-IDLE state establishes an RRC connection with E-UTRAN, the corresponding user equipment is in ECM-CONNECTED state. If MME in ECM-IDLE establishes 51 connection with E-UTRAN, it the corresponding MME is in ECM-CONNECTED state. When a user equipment is in ECM-IDLE state, E-UTRAN may not have context information of the user equipment. Hence, the user equipment in ECM-IDLE state ma perform a UE based mobility related procedure such as a cell selection and a cell reselection without receiving a command given by a network. On the contrary, when a user equipment in ECM-CONNECTED state, mobility of the user equipment is managed by a command of a network. If a location of a user equipment in ECM-IDLE state deviates from a location known to a network, the user equipment informs the network of a corresponding location of the user equipment through a tracking area update procedure.

Meanwhile, a radio link failure procedure in 3GPP LTE system is described as follows.

Figure 4:
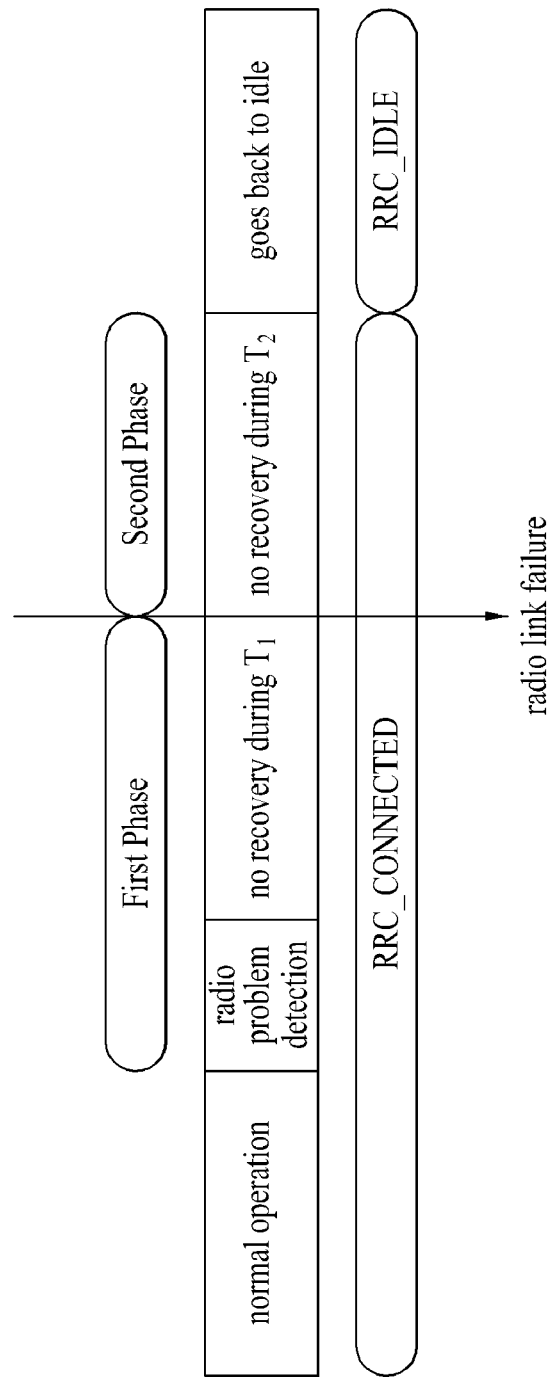
FIG. 4 is a diagram to describe an operation related to radio link failure.

First of all, when a user equipment is receiving a service from a cell, in order to maintain a quality of a communication link with the corresponding cell, the user equipment persistently performs measurement. In particular, the user equipment determines whether the quality of the communication link with the currently service-providing cell is a communication-unavailable situation. If the user equipment determines that the quality of the current cell is too poor to perform a communication, the user equipment declares a radio link failure. Once the user equipment declares the radio link failure, the user equipment stops maintaining the communication with the corresponding cell, selects a cell by a cell selection procedure, and then attempts an RRC connection re-establishment. Thus, the operation related to the radio link failure may be described as two phases shown in FIG. 4.

In a first stage, a user equipment checks whether a current communication link has a problem. If the problem is detected, the user equipment declares a radio link problem and then waits for a recovery of the communication link during a predetermined time T1. If the corresponding link is recovered during this time, the user equipment continues a normal operation. If the radio link problem is not solved during T1 in the first state, the user equipment declares a radio link failure and then enters a second stage. In the second stage, the user equipment performs an RRC connection re-establishment procedure for the recovery from the radio link failure.

The RRC connection re-establishment procedure is the procedure for re-establishing an RRC connection in RRC_CONNECTED state. Since a user equipment remains in the RRC_CONNECTED state (i.e., the user equipment does not enter RRC_IDLE state), the user equipment does not initialize all radio configurations (e.g., radio bearer configurations) of the user equipment. In stead, the user equipment temporarily suspends a use of all radio bearers except SRB0 on starting the RRC connection re-establishment procedure. If the RRC connection re-establishment is successfully completed, the user equipment resumes the use of the temporarily suspended radio bearers.

Figure 5:
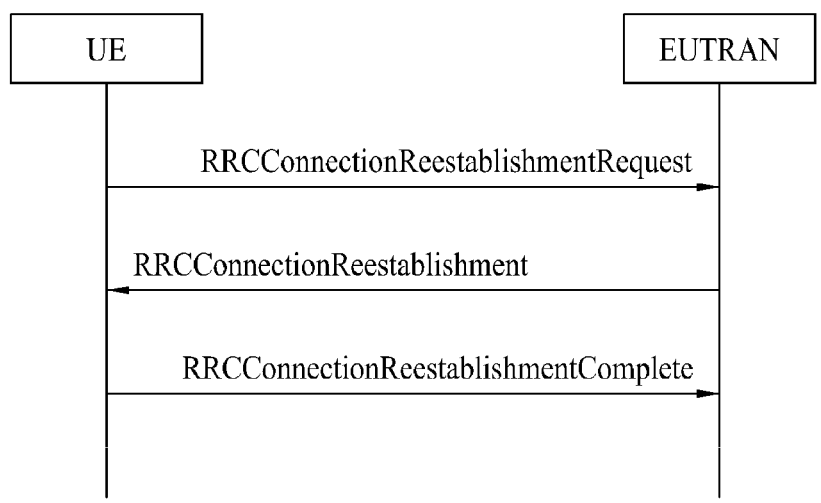
FIG. 5 and FIG. 6 show successful and failure cases of an RRC connection re-establishment procedure, respectively.
Figure 6:
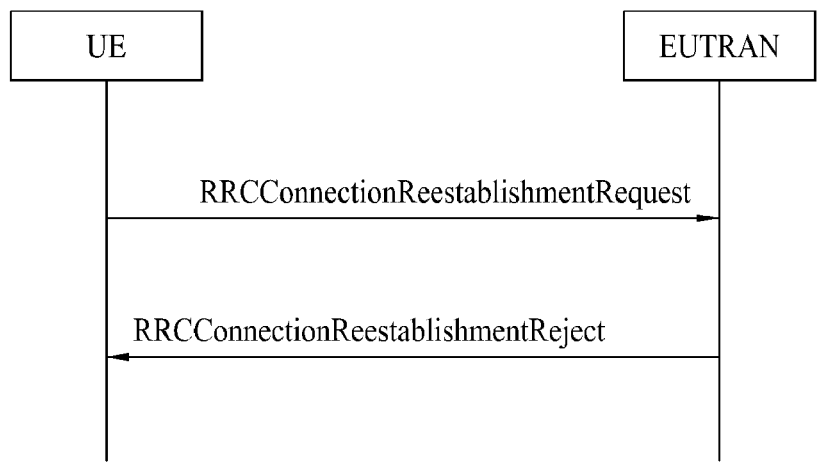

FIG. 5 and FIG. 6 show successful and failure cases of an RRC connection re-establishment procedure, respectively.

Referring to FIG. 5 and FIG. 6, according to an operation of a user equipment in an RRC connection re-establishment procedure, the user equipment firstly selects one cell by performing a cell selection. The user equipment receives system information from the selected cell to receive basic parameters for a cell access. Subsequently, the user equipment attempts an RRC connection re-establishment through a random access procedure. In case that the cell selected by the user equipment through the cell selection is the cell having a context of the user equipment, i.e., a prepared cell, the corresponding cell may accept an RRC connection re-establishment request made by the user equipment. Hence, the RRC connection re-establishment procedure may be successfully completed. On the contrary, if the cell selected by the user equipment is not the prepared cell, since the corresponding cell does not have the context of the user equipment, the corresponding cell rejects the RRC connection re-establishment request made by the user equipment. Hence, the RRC connection re-establishment procedure fails.

In the following description, a measurement procedure in such a 3GPP LTE system is explained.

Figure 7:
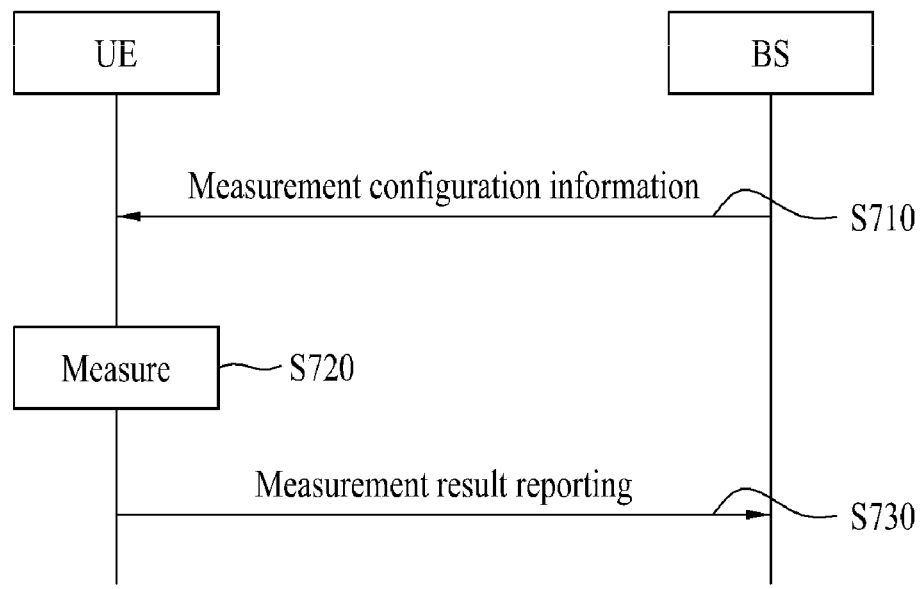
FIG. 7 is a diagram to describe a process for a user equipment to perform a measurement and report a measurement result to a network in 3GPP LTE system.

FIG. 7 is a diagram to describe a process for a user equipment to perform a measurement and report a measurement result to a network in 3GPP LTE system.

Referring to FIG. 7, a user equipment may be able to receive measurement configuration information from a base station [S710]. In the following description, a message containing this measurement configuration information is named a measurement configuration message. Based on the measurement configuration information, the user equipment may be able to perform a measurement [S720]. If a measurement result meets a reporting condition within the measurement configuration information, the user equipment may be able to report the measurement result to the base station [S730]. In the following description, a message containing the measurement result shall be named a measurement reporting message.

The measurement configuration information may contain the following informations.

1) Measurement object information: This information relates to an object on which a measurement will be performed by a user equipment. The measurement object may include at least one of an intra-frequency measurement object as an object of an intra-cell measurement, an inter-frequency measurement object and an object of an inter-cell measurement and an inter-RAT measurement object as an object of an inter-RAT measurement. For instance, the intra-frequency measurement object may indicate a neighbor cell having the same frequency band of a serving cell, the inter-frequency measurement object may indicate a neighbor cell having a frequency band different from that of a serving cell, and the inter-RAT measurement object may indicate a neighbor cell of RAT different from that of a serving cell.

2) Reporting configuration information: This information relates to a reporting condition relating to when a user equipment reports a measurement result and a reporting type. The reporting condition may include information on an event or period for triggering a reporting of a measurement result. And, the reporting type is the information indicating what kind of type will be used to configure a measurement result.

3) Measurement identity information: This information enables a user equipment to determine a time and type for reporting a prescribed measurement object by associating a measurement object and a reporting configuration with each other. The measurement identity information is contained in a measurement reporting message and may indicate that a measurement result relates to a prescribed measurement object and that a measurement reporting is generated on a prescribed reporting condition.

4) Quantity configuration information: This information relates to a parameter for configuring a filtering of a measurement unit, a reporting unit and/or a measurement result value.

5) Measurement gap information: This information related to a measurement gap of an interval usable for a user equipment to perform a measurement only without considering a data transmission to a serving cell because a downlink or uplink transmission is not scheduled.

In order to perform a measurement procedure, a user equipment may have a measurement object list, a measurement reporting configuration list and a measurement identity list.

In 3GPP LTE, a base station may set up a single measurement object on a single frequency band for a user equipment. According to Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)", events for triggering measurement reporting are defined as Table 1.

TABLE 1

| Event | Reporting Condition |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold 1 and neighbour becomes better than threshold d2 |
| Event B1 | Inter RAT neighbour becomes better than threshold |
| Event B2 | Serving becomes worse than threshold 1 and inter RAT neighbour becomes better than threshold 2 |

If a measurement result of a user equipment satisfies the above-configured event, the user equipment sends a measurement reporting message to a base station.

Figure 8:
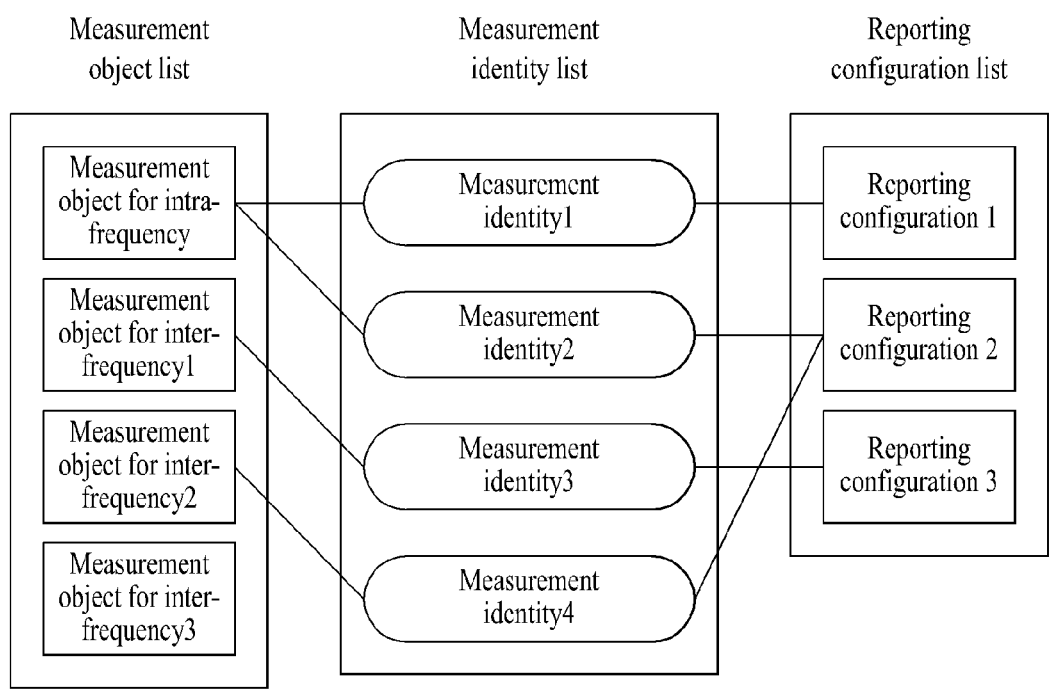
FIG. 8 shows one example of a measurement configuration set for a user equipment.

FIG. 8 shows one example of a measurement configuration set for a user equipment.

In the example shown in FIG. 8, a measurement identity 1 connects an intra-frequency measurement object and a reporting configuration 1 with each other. In this case, a user equipment performs an intra-frequency measurement and the reporting configuration 1 is used to determine a reference and reporting type of a measurement result reporting.

Although a measurement identity 2 is connected with an intra-frequency measurement object like the measurement identity 1, it connects an intra-frequency measurement object to a reporting configuration 2. A user equipment performs an intra-frequency measurement and the reporting configuration 2 is used to determine a reference and reporting type of a measurement result reporting.

By the measurement identity 1 and the measurement identity 2, a user equipment is able to transmit a measurement result to a network even if the measurement result on the intra-frequency object meets one of the reporting configuration 1 and the reporting configuration 2.

A measurement identity 3 connects an inter-frequency measurement object 1 and a reporting configuration 3 with each other. If a measurement result on the inter-frequency measurement object 1 meets a reporting condition contained in the reporting configuration 1, a user equipment is able to report a measurement result to a network.

A measurement identity 4 connects an inter-frequency measurement object 2 and a reporting configuration 2 with each other. If a measurement result on the inter-frequency measurement object 2 meets a reporting condition contained in the reporting configuration 2, a user equipment is able to report a measurement result to a network.

Meanwhile, it may be able to add, change and/or remove a measurement object, a reporting configuration and/or a measurement identity. This may be instructed in a manner that a base station sends a new measurement configuration message or a measurement configuration change message.

Figure 9:
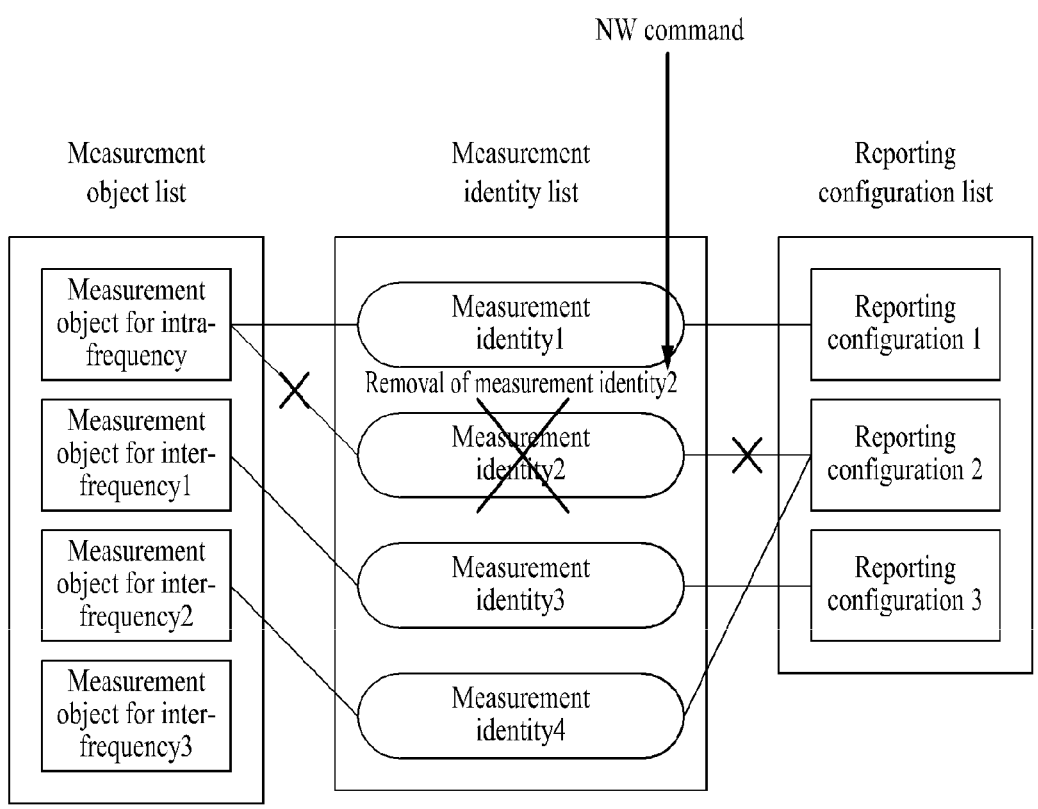
FIG. 9 shows one example of removing a measurement identity.

FIG. 9 shows one example of removing a measurement identity.

Referring to FIG. 9, 'NW command' may include a measurement configuration message or a measurement configuration change message for instructing a measurement identity to be removed. If the measurement identity 2 is removed, a measurement of a measurement object associated with the measurement identity 2 is stopped and a measurement reporting is not transmitted. Yet, the measurement object or reporting configuration associated with the removed measurement identity may not be changed.

Figure 10:
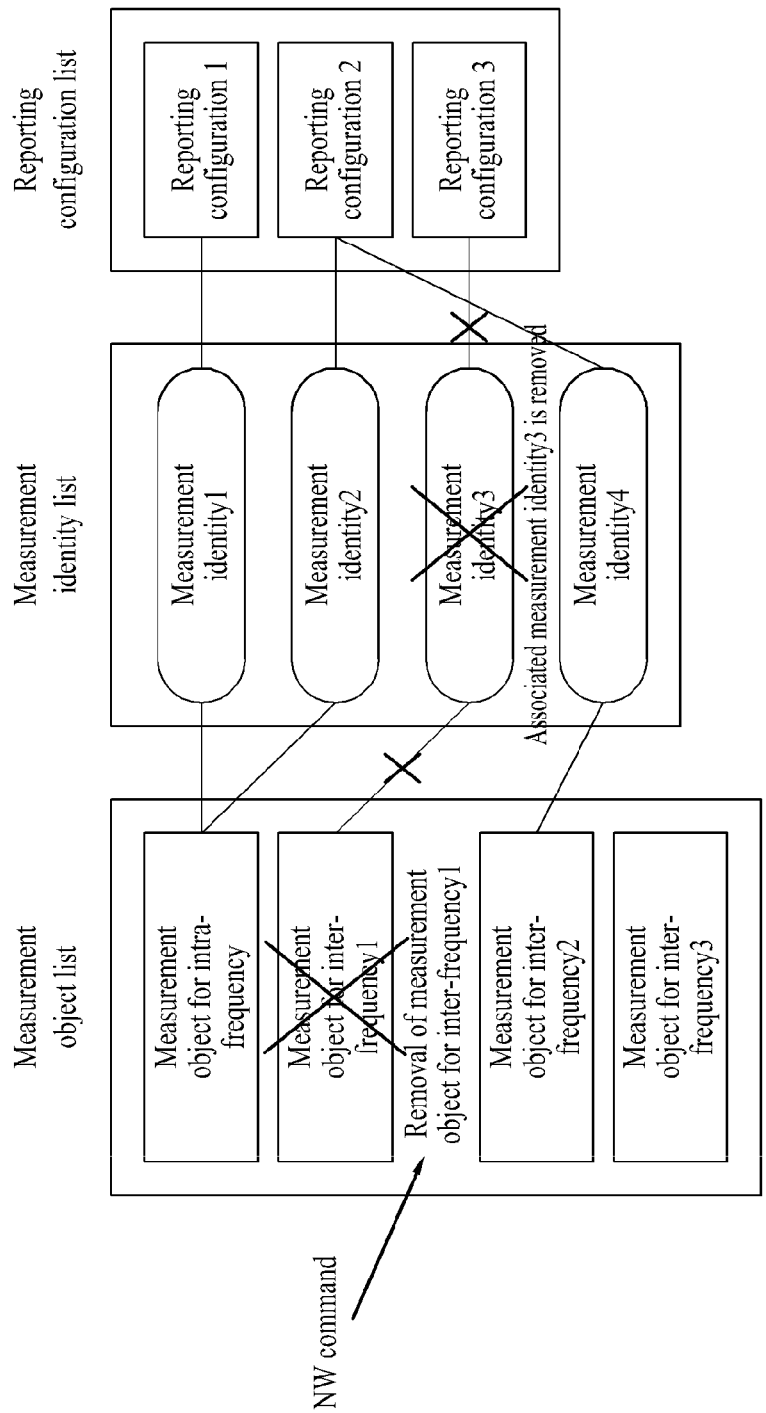
FIG. 10 shows one example of removing a measurement object.

FIG. 10 shows one example of removing a measurement object.

Referring to FIG. 10, 'NW command' may include a measurement configuration message or a measurement configuration change message for instructing an inter-frequency measurement object 1 to be removed. If the inter-frequency measurement object 1 is removed, a user equipment may be able to receive an associated measurement identity 3 as well. Hence, a measurement of the inter-frequency measurement object 1 is stopped and a measurement reporting may not be transmitted. Yet, the measurement object or reporting configuration associated with the removed inter-frequency measurement object 1 may not be changed.

If the reporting configuration is removed, the user equipment removes the associated measurement identity as well. The user equipment stops a measurement of a measurement of a measurement object associated by the associated measurement identity and a corresponding measurement reporting. Yet, the measurement object associated with the removed reporting configuration may not be changed or removed.

Through the measurement configuration or the measurement configuration change mentioned in the above description, a user equipment may be able to perform an efficient measurement by adjusting a measurement object within its measurement object list. Yet, in aspect of the user equipment, it may be preferable to provide a mechanism (scheme) of performing a measurement on a measurement object within a restricted range.

Figure 11:
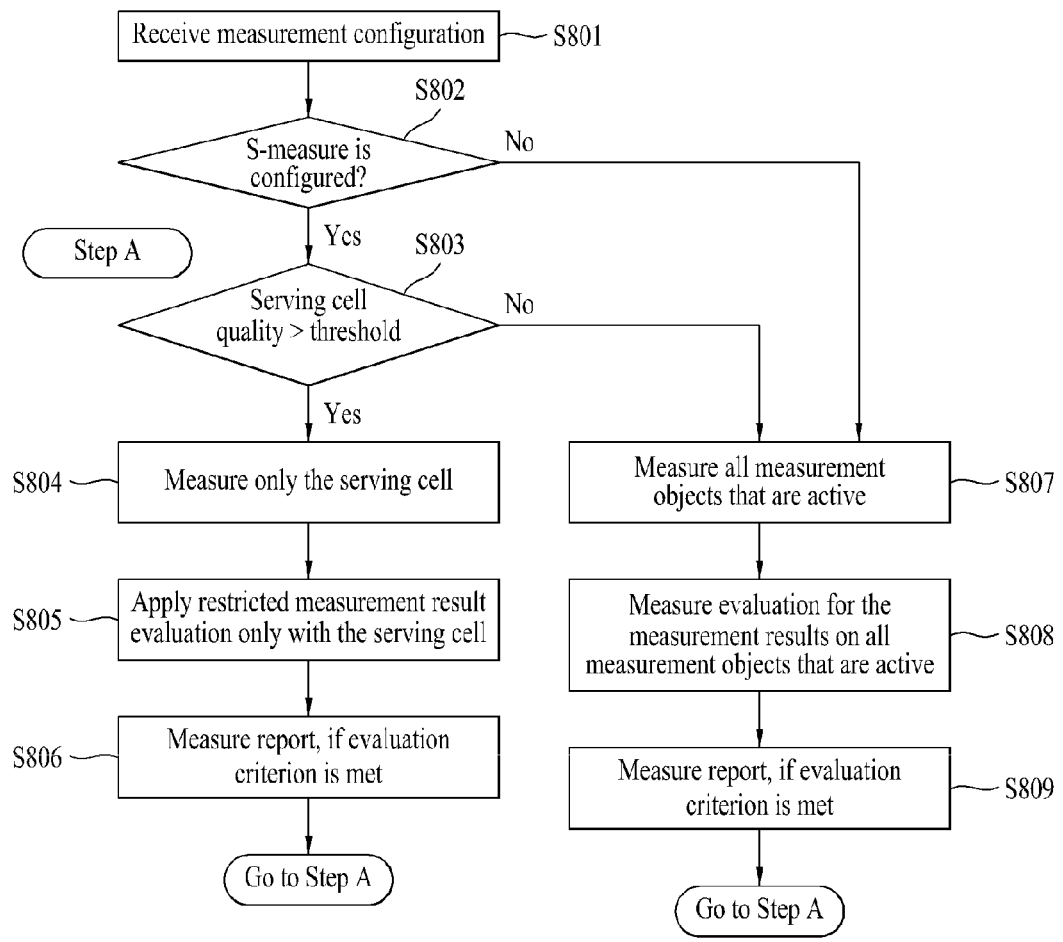
FIG. 11 is a diagram to describe a serving cell quality criterion measuring method as a base of a measurement method applied to the present invention.

FIG. 11 is a diagram to describe a serving cell quality criterion measuring method as a base of a measurement method applied to the present invention. In the following description, a serving cell quality measurement scheme shall be simply named s-measurement.

First of all, a user equipment may be able to receive a measurement configuration information described with reference to FIGS. 8 to 10 from a network [S801]. Based on this measurement configuration information, the user equipment may be able to determine whether s-measure is configured [S802]. If the network configures the s-measure based on the measurement configuration information, the user equipment measures a quality of a serving cell and may be the able to compare whether this value is greater than an s-measure threshold [S803]. If the quality value of the serving cell is greater than the s-measure threshold, the user equipment proposes that a measurement of another neighbor cell except the serving cell is configured not to be performed irrespective if the measurement configuration [S804 to S806]. In particular, the user equipment performs a measurement on the serving cell only [S804]. Since an evaluation object for the measurement reporting is restricted due to the restricted measurement objects as well [S805], the measurement reporting of the user equipment is restricted to the measurement reporting associated with the serving cell of the user equipment as well [S806].

If the s-measure is not configured in the corresponding user equipment or the quality of the serving cell is equal to or smaller than the s-measure threshold despite that the s-measure is configured, the user equipment performs measurements on all measurement objects (named ACTIVE measurement objects in FIG. 11 and the following description) configured to be measured by the user equipment according to the measurement configuration.

Through the above-mentioned s-measure mechanism, a user equipment may be able to enhance efficiency of power use in association with a measurement and a measurement reporting. Yet, the aforementioned s-measure mechanism assumes a case that there is a single serving cell only. In case that a user equipment simultaneously communicates with a plurality of serving cells like a case of applying carrier aggregation, a further detailed mechanism may be necessary. To this end, a carrier aggregation is explained in the following description.

Figure 12:
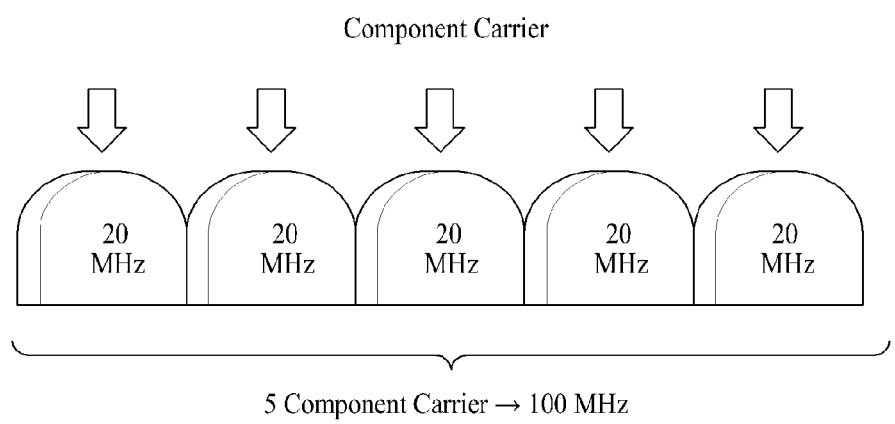
FIG. 12 is a diagram to describe a carrier aggregation technology applied to 3GPP LTE-A system.

FIG. 12 is a diagram to describe a carrier aggregation technology applied to 3GPP LTE-A system.

LTE-A technology standard is IMT-Advanced candidate technology of ITU (international telecommunication union) and is designed to coincide with IMT-Advanced technology requirements. Hence, in order to satisfy the requirements of ITU, the ongoing discussion on extending a bandwidth wider than that of a legacy LTE system is made by LTE-A. In order to extend a bandwidth in LTE-A system, a carrier of a legacy LTE system is defined as a component carrier (hereinafter abbreviated CC) and maximum 5 component carriers are combined to be used in the ongoing discussion. Since CC may be able to have a maximum bandwidth of 20 MHz like the LTE system, a bandwidth may be conceptionally extensible up to maximum 100 MHz. Thus, the technique of using a plurality of component carriers (CCs) by combining them together is called carrier aggregation (hereinafter abbreviated CA).

Figure 13:
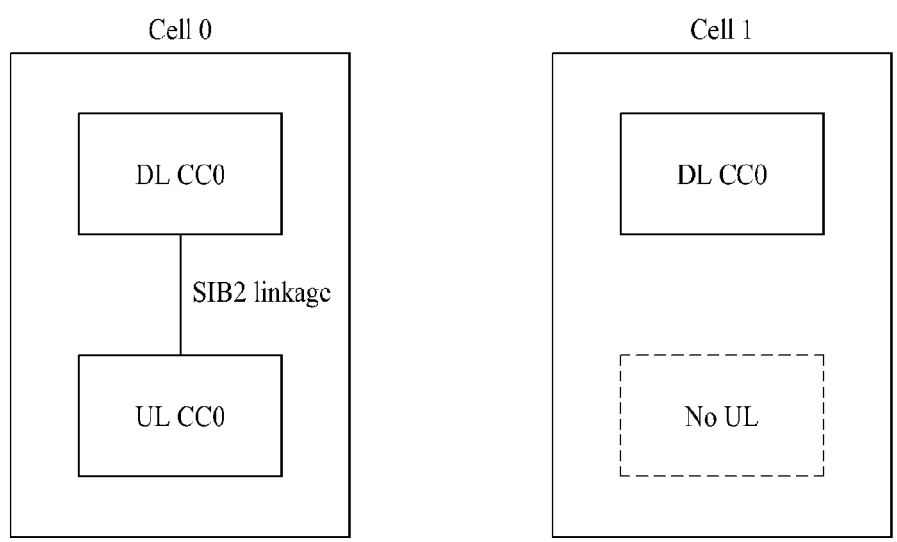
FIG. 13 is a diagram to describe definition of a cell in aspect of a user equipment in case of applying a carrier aggregation technology.

FIG. 13 is a diagram to describe definition of a cell in aspect of a user equipment in case of applying a carrier aggregation technology.

First of all, as mentioned in the foregoing description with reference to FIG. 12, if the CA is applied, a plurality of CCs may be included for each of downlink (hereinafter abbreviated DL) and uplink (hereinafter abbreviated UL). In this system, a combination of DL CC and UL CC (e.g., cell 0 in FIG. 13) or a DLL CC (e.g., cell 1 in FIG. 3) only may be regarded as a cell in aspect of a user equipment. Referring to FIG. 13, a linkage relation between DL CC and UL CC may be indicated via system information carried on DL resource. In particular, system information of a CA applied mobile communication system contains information on a linkage relation between UL CC and DL CC in addition to the aforementioned system information, which is illustrated as SIB2 linkage in FIG. 13.

Meanwhile, LTE-A system proposes that CCs for carrying all control signalings are conceptionally named primary CC identifiable from other CCs. UL primary CC and DL primary CC are configured for each user equipment. Thus, a combination of UL primary CC used for UL control information transmission and DL primary CC used for DL control information transmission may be named Primary Cell or PCell. Other Cells configured for a user equipment than the Primary Cell or PCell may be named Secondary Cell or SCell.

In the mobile communication system using the CA mentioned in the foregoing description, a user equipment may be able to communicate with PCell and SCells simultaneously. Hence, the user equipment may be able to have a plurality of serving cells simultaneously. In this case, a method of applying the aforementioned s-measure efficiently is described as follows.

In brief, according to one preferred embodiment of the present invention, if a serving cell quality criterion measurement mechanism, i.e., an s-measure is configured for a user equipment, proposed is to perform the above-described s-measure mechanism in a manner of additionally determining whether a plurality of serving cells are currently configured for the user equipment and then determining whether a quality representative value of a plurality of the serving cells is equal to or greater than a threshold if a plurality of the serving cells are configured. Moreover, if the quality representative value of a plurality of the serving cells is equal to or greater than the threshold, the user equipment of the present embodiment is proposed to perform a quality measurement within a restricted range in consideration of a plurality of the serving cells.

In the following description, methods according to a detained embodiment are explained as:

1. A method for a user equipment to calculate a quality representative value of serving cells; and 2. A method of performing a quality measurement within a restricted range in consideration of a plurality of serving cells.

1. Method for Calculating Quality Representative Value of Serving Cells at User Equipment According to the aforementioned embodiment, as a method for a user equipment to calculate a quality representative value of serving cells, is may be able to use one of: 1) a method of setting a quality representative value of a plurality of serving cells to a quality value of a specific one of a plurality of the serving cells; 2) a method of calculating a quality representative value of a plurality of serving cells by considering qualities of a plurality of the serving cells simultaneously; 3) a method of considering both of the method 1) and the method 2); and 4) a method of calculating a quality representative value of a plurality of serving cells with reference to an object configured by a network. These methods mean various embodiments of the present invention and are described in detail as follows.

1) Method of Setting a Quality Representative Value of a Plurality of Serving Cells to a Quality Value of a Specific One of a Plurality of the Serving Cells First of all, in order to set a quality representative value of a plurality of serving cells to a quality value of a specific one of a plurality of the serving cells, various methods may be usable as embodiments of the present invention as follows.

1-1) A method of setting a serving cell quality representative value to a quality of a serving cell, which is configured to have high significance like the aforementioned primary cell, among a plurality of serving cells 1-2) A method of setting a serving cell quality representative value to a quality of a specific serving cell, which provides an input parameter related to a security configuration of a user equipment, among a plurality of serving cells 1-3) A method of setting a serving cell quality representative value to a quality of a serving cell, which is used by a user equipment as a reference CC of discontinuous reception (DRX) operation when a plurality of CCs simultaneously performs the DRX operation with reference to an operation of one CC, among a plurality of serving cells 1-4) A method of setting a serving cell quality representative value to a quality of a specific serving cell, which is mainly used by a user equipment in acquiring system information, among a plurality of serving cells 1-5) A method of setting a serving cell quality representative value to a quality of a serving cell, which has a poorest quality, among a plurality of serving cells 1-6) A method of setting a serving cell quality representative value to a quality of a serving cell, which has a best quality, among a plurality of serving cells In cases of the methods 1-1) to 1-4) for selecting a serving cell becoming a reference for a quality representative value determination from a plurality of the serving cells, the all serving cells may be PCell in aspect of function discrimination. Yet, in accordance with a CA applied mobile communication system, a prescribed function may be performed by at least one SCell. In this case, the SCell, which performs the above function independently or together with PCell, may be used for the serving cell quality representative value calculation according to the present embodiment.

2) A Method of Calculating a Quality Representative Value of a Plurality of Serving Cells by Considering Qualities of a Plurality of the Serving Cells Simultaneously In the following description, explained is a method of calculating a quality representative value of a plurality of serving cells by considering qualities of a plurality of the serving cells simultaneously. First of all, in order to calculate a quality representative value of a plurality of serving cells by considering qualities of a plurality of the serving cells simultaneously, a user equipment may be able to use a method of setting the quality representative value of a plurality of the serving cells to a linear combination value of channel quality values related to a plurality of the serving cells. In this case, the linear combination means an arithmetic sum of values resulting from multiplying a value determined by each representative value setting method by a weight associated with each representative value. In doing so, assume that a sum of the weights by which each quality value is applied is 1 and that each weight meets a condition equal to or greater than 0. For instance, assuming that quality values of a plurality of serving cells are set to $Q_1$ to $Q_N$, respectively, a linear combination value may be determined as $W_1*Q_1+W_2*Q_2+ \ldots +W_N*Q_N$. In this case, it is '$W_1+W_2+ \ldots +W_N=1$' and may meet '$W_1, W_2, \ldots W_N \geq 0$'.

The linear combination value may be calculated in a manner of being limited to a plurality of serving cells each of which meets a specific condition. And, information on the used weight may be a value previously agreed between a user equipment and a network or may be received from a network by a user equipment.

3) A Method of Considering Both of Two Kinds of Methods

In order to calculate a quality representative value of a plurality of serving cells by considering qualities of a plurality of the serving cells simultaneously, a user equipment may be able to calculate a quality representative value by satisfying both of the condition 1) and the condition 2), i.e., according to Logical AND condition. In particular, according to the present embodiment, the user equipment evaluates both of the condition 1) and the condition 2) simultaneously. If both of both of the condition 1) and the condition 2) are simultaneously met, the user equipment may be able to perform a power-efficiently measurement.

According to another mechanism, in order to calculate a quality representative value of a plurality of serving cells by considering qualities of a plurality of the serving cells simultaneously, If one of the condition 1) and the condition 2) is met (i.e., Logical OR), the user equipment may be able to perform a power-efficient measurement.

4) A Method of Calculating a Quality Representative Value of a Plurality of Serving Cells with Reference to an Object Configured by a Network As mentioned in the foregoing description with reference to FIG. 11, a user equipment receives measurement configuration information from a network. According to the present embodiment, the received measurement configuration information includes information on a target serving cell used for the user equipment to calculate a quality representative value among a plurality of serving cells and/or information on a target serving cell determining mechanism and the quality representative value is then calculated in accordance with this criterion.

In particular, a base station may be able to provide the aforementioned information on the quality representative value determining mechanism in addition to threshold information used for the s-measure.

Method of Performing a Quality Measurement within a Restricted Range in Consideration of a Plurality of Serving Cells According to one preferred embodiment of the present invention, a method (i.e., a power-efficient measurement method) for a user equipment having a plurality of serving cells configured therefor to perform a quality measurement within a restricted range in consideration of a plurality of the serving cells is described as follow. First of all, instead of measuring all measurement objects according to a measurement configuration received from a network, a user equipment restricts a measurement object to a frequency of a serving cell, thereby raising its power use efficiency. A method of performing a quality measurement within a restricted range in consideration of a plurality of serving cells may include one of various embodiments as follows.

1) Method of Restricting Measurement Object to Serving Frequencies

In this case, a serving frequency may mean a frequency on which a serving cell exists. And, measuring a serving frequency may mean measuring both a serving cell and a neighbor cell on the corresponding frequency. Hence, even if both a report configuration and a measurement ID are configured in a measurement object, a user equipment may not measure the corresponding measurement object unless this measurement object is the serving frequency. Consequently, according to the present embodiment, a serving cell and all measurable neighbor cells on the same frequency of the serving cell are taken into consideration for a measurement result evaluation for the measurement reporting.

2) Method of Restricting Measurement Object to All Serving Cells

According to the present embodiment, for the evaluation of a measurement reporting by a user equipment, serving cells are taken into consideration only. A neighbor cell on the same frequency of a serving cell is not taken into consideration for the evaluation of the measurement reporting by the user equipment and is excluded from the measurement reporting object.

3) Method of Restricting a Measurement Object to a Specific Serving Cell Having Highest Significance According to the present embodiment, for the evaluation of a measurement reporting by a user equipment, a specific cell used for the aforementioned quality representative value calculation of a plurality of serving cells may be taken into consideration. In particular, the user equipment may measure a primary cell of the user equipment, a specific serving cell providing an input parameter related to a security configuration of the user equipment, a specific serving cell used as a reference CC of DRX operation, when a plurality of CCs simultaneously perform the DRX operation with reference to an operation of one CC, among a plurality of serving cells, a specific serving cell mainly used for the user equipment to acquire system information among a plurality of serving cells, a serving cell having a poorest quality among a plurality of serving cells, or a serving cell having a best quality among a plurality of serving cells only. In doing so, if a measurement object is set to coincide with serving cells becoming the references for the channel quality representative value calculation, it may be more efficient in aspect of the user equipment, by which the measurement object may be non-limited.

4) Method of Restricting Measurement Object to all Cells on a Specific Frequency, on which a Most Significant Cell Exists, i.e., to Serving and Neighbor Cells on the Specific Frequency According to the present embodiment, for the evaluation of a measurement reporting by a user equipment, all cells within a frequency, on which a cell used be a reference for the quality representative value calculation exists, may become measurement objects. In particular, all cells on a frequency having a primary cell of the user equipment exit thereon may be measured. Alternatively, all cells on a frequency, on which a specific serving cell providing an input parameter related to a security configuration of the user equipment exists, are measured. Alternatively, all cells on a frequency, on which a specific serving cell used as a reference CC of DRX operation among a plurality of serving cells exists when a plurality of CCs simultaneously perform the DRX operation with reference to an operation of one CC, may be measured. Alternatively, all cells on a frequency, on which a specific serving cell mainly used for the user equipment to acquire system information among a plurality of serving cells exists, may be measured. Alternatively, all cells on a frequency, on which a serving cell having a poorest quality exists among a plurality of serving cells, may be measured. Alternatively, all cells on a frequency, on which a serving cell having a best quality exists among a plurality of serving cells, may be measured.

Based on the above description, an s-measure mechanism in a CA used mobile communication system according to one preferred embodiment of the present invention is explained as follows.

Figure 14:
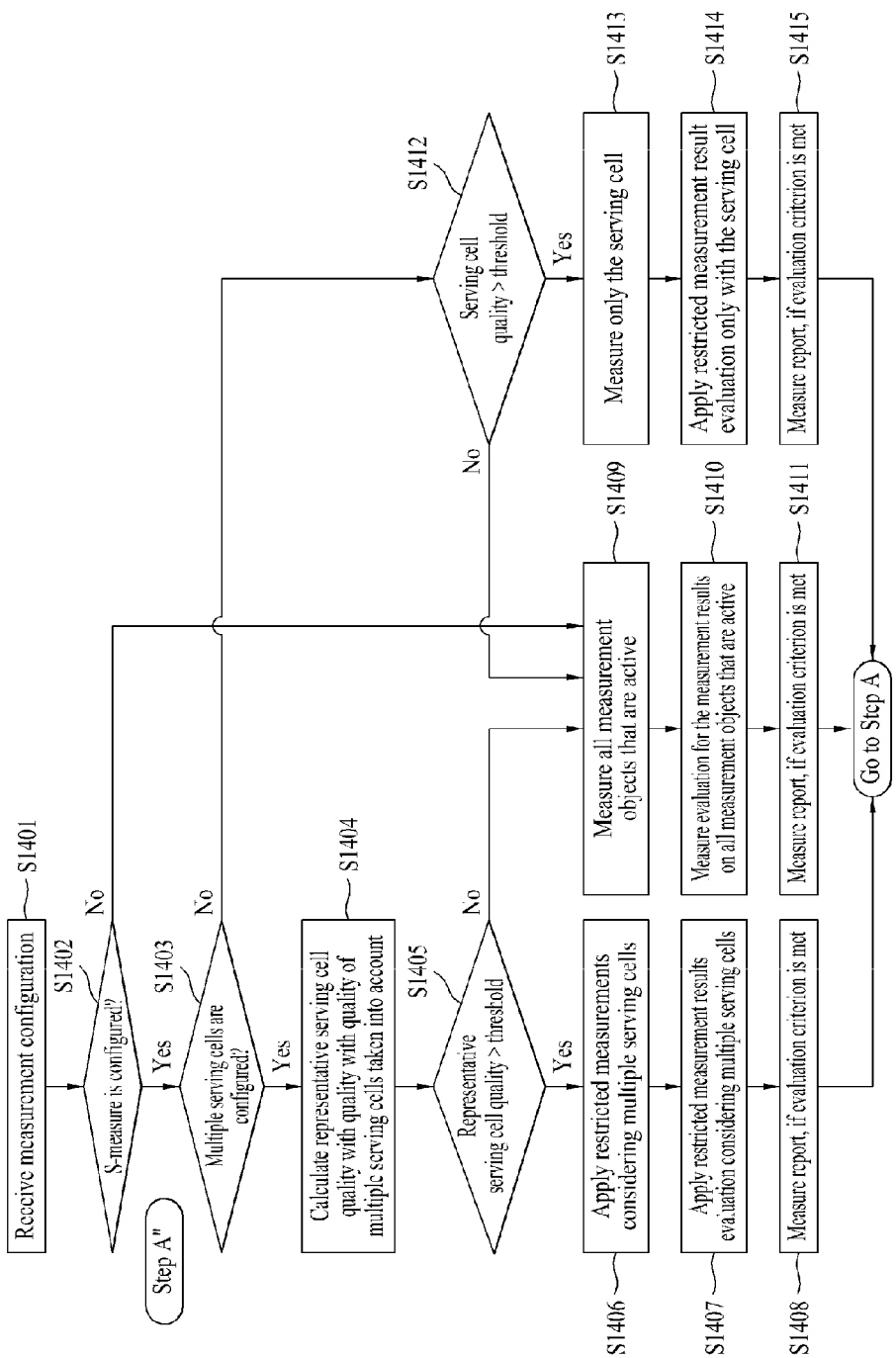
FIG. 14 is a diagram to describe a serving cell quality criterion measuring method in case of communication between a user equipment and a plurality of serving cells according to one preferred embodiment of the present invention.

FIG. 14 is a diagram to describe a serving cell quality criterion measuring method, when a user equipment communicates with a plurality of serving cells, according to one preferred embodiment of the present invention.

Referring to FIG. 14, like the former embodiment shown in FIG. 11, a user equipment may be able to receive the measurement configuration information, as mentioned in the foregoing description with reference to FIGS. 8 to 10, form a network [S1401]. This measurement configuration information may additionally include information on a method of determining cells to be used for a quality representative value among a plurality of serving cells according to an embodiment as well as threshold information for s-measure but also information.

Based on the measurement configuration information, the user equipment may be able to determine whether an s-measure is configured [S1402]. If the network configures the s-measure based on the measurement configuration information, according to the present embodiment, it may be able to additionally determine whether a plurality of serving cells are configured for the user equipment [S1403]. In particular, in the CA used mobile communication system, a network is able to allocate a plurality of cells to a user equipment via system information and the user equipment is able to perform communications over wide bandwidth via them. If a plurality of serving cells are configured for the user equipment, the user equipment of the present embodiment is able to calculate a channel quality representative value of a plurality of the serving cells in the same manner mentioned in the foregoing description [S1404]. For the method of calculating the channel quality representative value of a plurality of the serving cells, various embodiments mentioned in the foregoing description may be usable. In the following description, assume that a user equipment simply calculates a quality representative value with reference to PCell.

Having calculated the quality representative value of a plurality of the serving cells, the user equipment may be able to compare whether this quality representative value is greater than an S-measure threshold [S1405]. If the quality representative value of a plurality of the serving cells is greater than the s-measure threshold, the user equipment may be able to perform a channel quality measurement within a power-efficiently restricted range irrespective of the measurement configuration [S1406 to S1408]. In particular, as mentioned in the foregoing description, the measurement objects are restricted to the serving cells used for the channel quality representative value calculation or the measurement may be performed by including neighbor cells within a frequency on which the serving cells exist [S1406]. Moreover, evaluation on the channel quality value measured within the restricted range may be performed with reference to a plurality of the serving cells [S1407]. Moreover, if the measured channel quality value satisfies an evaluation criterion, it may be reported to the network. In the following evaluation criteria, 'serving (cell)' may become a quality of a cell used for the aforementioned quality representative value calculation, e.g., PCell.

TABLE 2

Event A1 (Serving becomes better than threshold)
Event A2 (Serving becomes worse than threshold)
Event A3 (Neighbour becomes offset better than serving)
Event A5 (Serving becomes worse than threshold1 and neighbour becomes better than threshold2)
Event B2 (Serving becomes worse than threshold1 and inter RAT neighbour becomes better than threshold2)

Besides, if the s-measure mechanism is not activated in the user equipment in the step S1402 or a plurality of serving cells are not configured for the user equipment in the step S1403, it may become the same case of the former embodiment mentioned with reference to FIG. 11, of which description is omitted in the following description.

In the following description, a user equipment device and a base station device for performing the aforementioned s-measure mechanism according to another embodiment of the present invention are explained.

Figure 15:
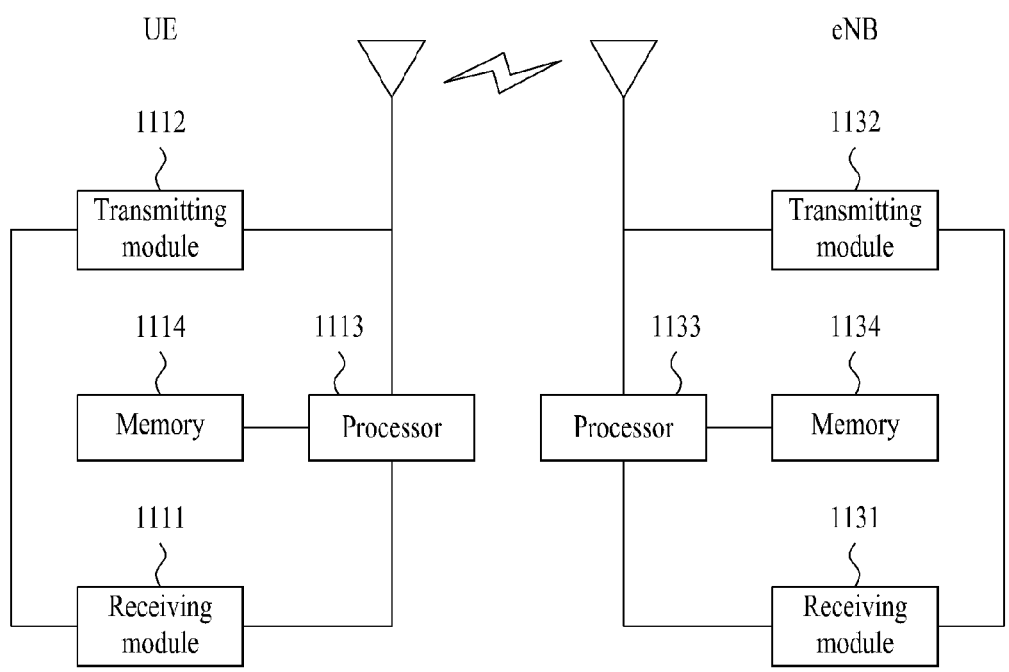
FIG. 15 is a diagram for a configuration of a wireless communication system including a user equipment device and a base station device according to an embodiment of the present invention.

FIG. 15 is a diagram for a configuration of a wireless communication system including a user equipment device and a base station device according to an embodiment of the present invention.

Referring to FIG. 15, a user equipment (UE) device may include a receiving module 1111, a transmitting module 1112, a processor 1113 and a memory 1114. The receiving module 1111 may be able to receive various signals, data, information and the like from a base station and the like. The transmitting module 1112 may be able to transmit various signals, data, information and the like to the base station and the like. The receiving module 1111 may be able to receive the aforementioned measurement configuration information from a network. The processor 1113 may be able to control a channel quality measurement operation to be performed via the measurement configuration information received via the receiving module 1111. In particular, if the user equipment supports a serving cell quality criterion measurement scheme and is configured to communicate with a plurality of serving cells simultaneously, the processor 1113 may be configured to determine whether a quality representative value of a plurality of the serving cells is equal to or greater than a threshold. If the quality representative value is equal to or greater than the quality representative value, the processor 1113 may be configured to perform a quality measurement within a restricted range in consideration of a plurality of the serving cells.

Meanwhile, a base station (eNB) device may include a receiving module 1131, a transmitting module 1132, a processor 1133 and a memory 1134. The receiving module 1131 may be able to receive various signals, data, information and the like from a user equipment and the like. The transmitting module 1132 may be able to transmit various signals, data, information and the like to the user equipment and the like.

The processor 1133 may control the transmitting module 1132 to transmit configuration information on a specific one of a plurality of CCs to the user equipment. And, the processor 1133 may be able to manage mobility of the corresponding user equipment via a measurement reporting message received by the receiving module 1131 from the user equipment. The processor 1133 may perform a function of operation processing of information received from the user equipment, information to be externally transmitted and the like. The memory 1134 may be able to store the operation processed information and the like for prescribed duration and may be substituted with such a component as a buffer (not shown in the drawing) and the like.

Meanwhile, a configuration of the processor which becomes a core of each of the configurations of the user equipment and base station is described in detail as follows.

Figure 16:
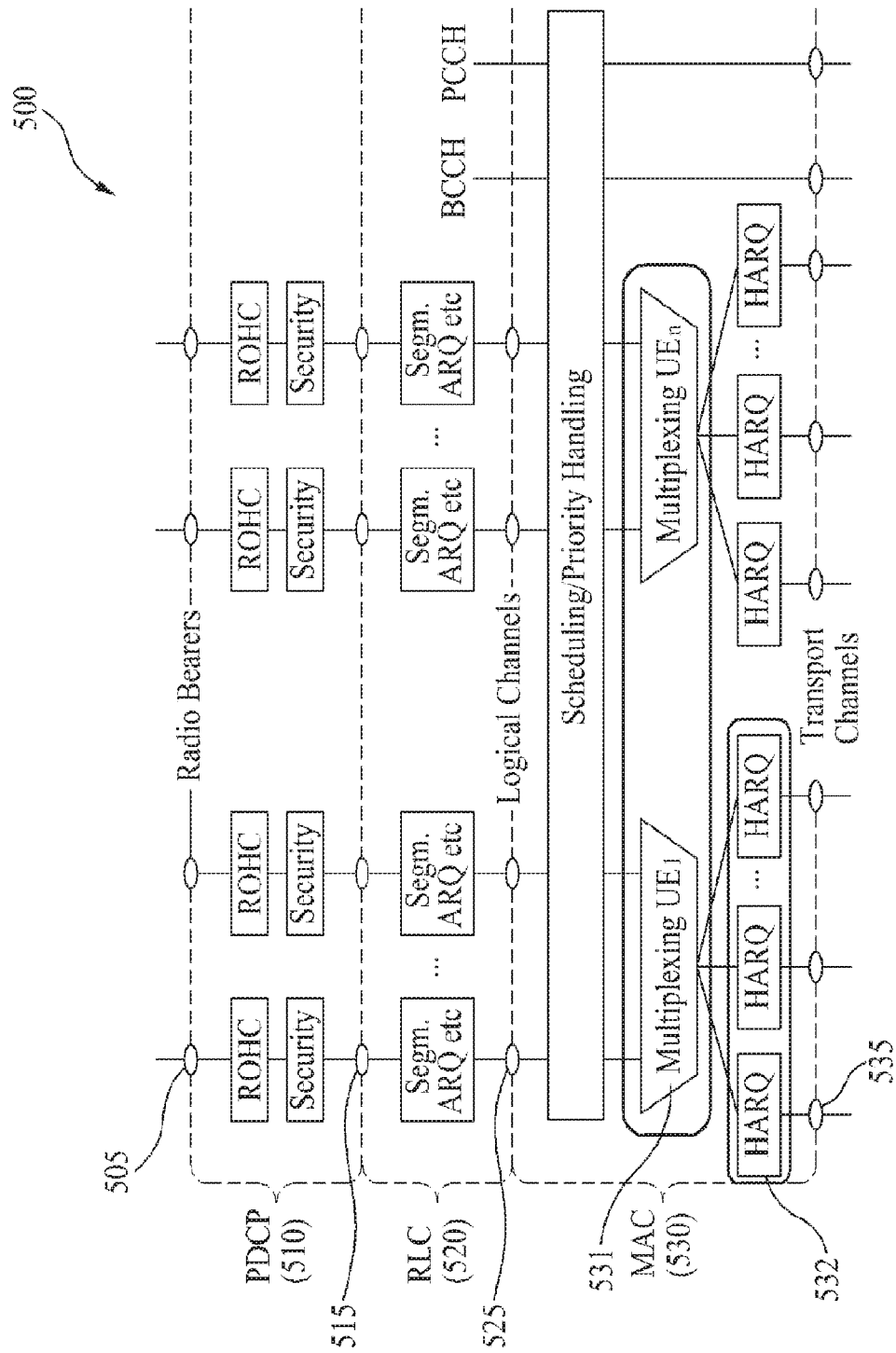
FIG. 16 is a diagram for a processor function of a base station, and more particularly, for a structure of L2 layer ($2^{nd}$ layer) to which embodiments of the present invention are applied.
Figure 17:
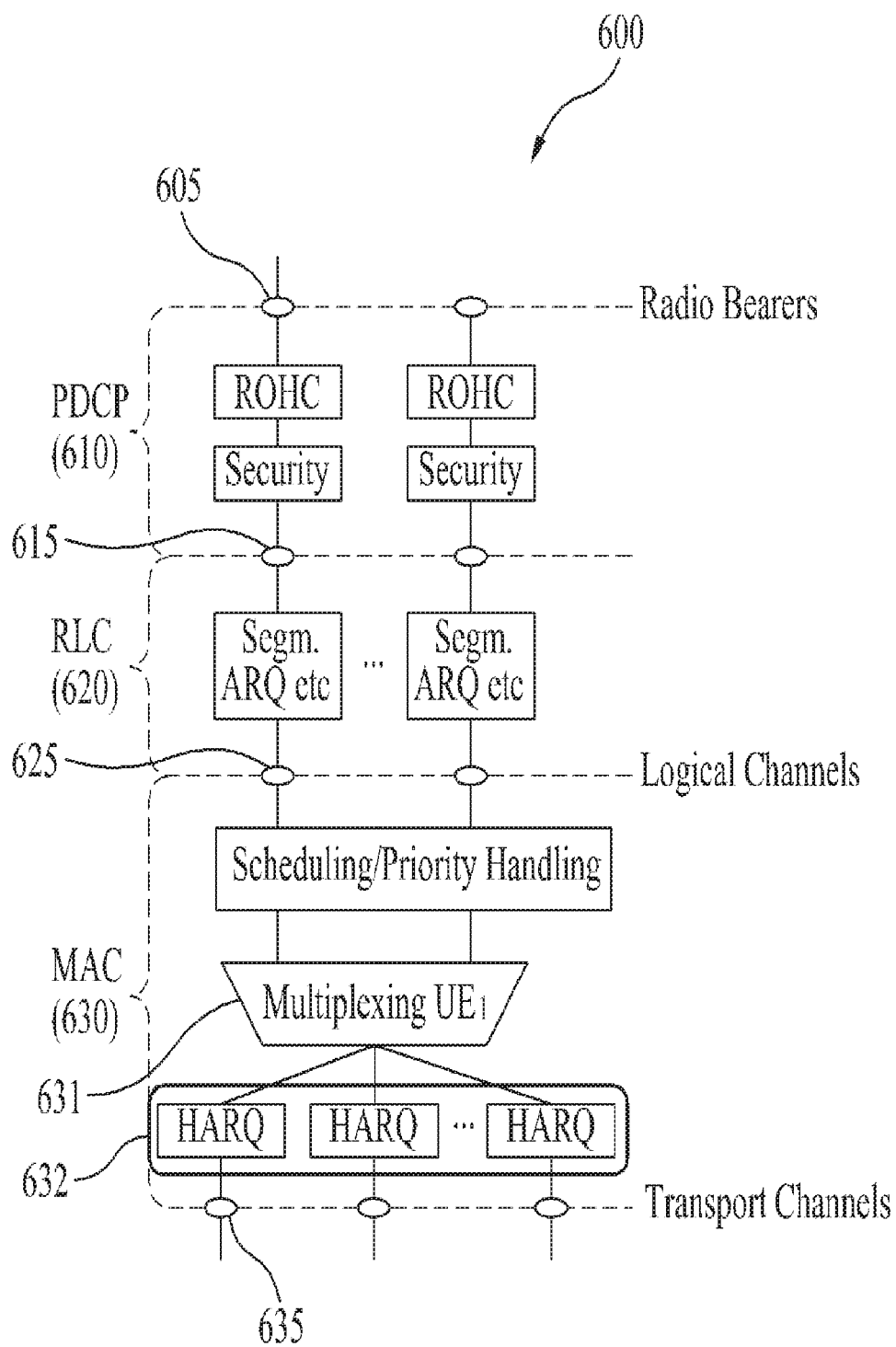
FIG. 17 is a diagram for a processor function of a user equipment, and more particularly, for a structure of L2 layer ($2^{nd}$ layer) to which embodiments of the present invention are applied.

FIG. 16 is a diagram for a processor function of a base station, and more particularly, for a structure of L2 layer ($2^{nd}$ layer) to which embodiments of the present invention are applied, and FIG. 17 is a diagram for a processor function of a user equipment, and more particularly, for a structure of L2 layer ($2^{nd}$ layer) to which embodiments of the present invention are applied.

In a DL L2 structure 500 shown in FIG. 16, layers of PDCP 510, RLC 520 and MAC 530 are represented. In FIG. 16, elements 505, 515, 525 and 535 provided to interfaces between the layers indicate service access points (SAP) for peer-to-peer communications. The SAP between PHY channel (not shown in the drawing) and the MAC layer provides a transport channel [535]. And, the SAP between the MAC layer and the RLC layer provides a logical channel [525]. General operations of the respective layers are as good as mentioned in the foregoing description.

The MAC layer multiplexes a plurality of logical channels (i.e., radio bearers) from the RLC layer. In the DL L2 structure, a plurality of multiplexing entities 531 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 531 [not shown in the drawing].

On the other hand, in a base station processor that considers carrier aggregation technology, a plurality of transport channels corresponding to a plurality of component carriers are generated from one multiplexing entity 531. Regarding this, in the carrier aggregation (CA) technology, one HARQ entity 532 manages one component carrier. Hence, the MAC layer 530 of the base station processor, which supports the carrier aggregation technology, provides one multiplexing entity 531 with a plurality of HARQ entities 532 and performs operations related to them. Since each of the HARQ entities 532 handles a transport block independently, a plurality of transport blocks may be simultaneously transmitted/received via a plurality of component carriers.

The UL L2 structure 600 shown in FIG. 17 (i.e., the processor L2 structure of the user equipment) performs the same operations of the DL L2 structure 500 shown in FIG. 16 except that one multiplexing entity 630 is included in one MAC layer 630. In particular, a plurality of HARQ entities 632 are provided for a plurality of component carriers, operations related to a plurality of the HARQ entities 632 are performed in the MAC layer 630, and a plurality of transport blocks can be simultaneously transmitted/received via a plurality of the component carriers.

The embodiments of the present invention mentioned in the foregoing description may be implemented using various means. For instance, embodiments of the present invention can be implemented using hardware, firmware, software and/or any combinations thereof.

In the implementation by hardware, a method according to each embodiment of the present invention may be implemented by at least one selected from ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the embodiments of the present invention mentioned in the foregoing description are mainly explained in case of being applied to 3GPP LTE based mobile communication system for clarity, they may be applicable in the same manner to various kinds of mobile communication systems in which a user equipment is able to simultaneously use a plurality of component carriers (CC) using a measurement operation for the mobility management of the user equipment.

What is claimed is:

1. A method of performing measurement at a user equipment (UE) in a wireless communication system, the method comprising:
receiving measurement configuration information including a plurality of measurement objects and a s-measure value related to a neighbor cell measurement;
measuring activated serving cells indicated by the plurality of measurement objects to obtain a plurality of measurement results, the activated serving cells including a s-measure associated serving cell and at least one s-measure non-associated serving cell;
comparing the s-measure value only with a first measured value from the plurality of measurement results, the first measured value being related to the s-measure associated serving cell;
when the first measured value is lower than the s-measure value, measuring the s-measure associated serving cell and the at least one s-measure non-associated serving cell;
comparing a measurement of the at least one s-measure non-associated serving cell from with a threshold for a reporting event configured in the UE; and
transmitting a measurement report of the at least one s-measure non-associated serving cell when the measurement of the at least one s-measure non-associated serving cell satisfies the threshold for the reporting event,
wherein the s-measure value is dedicated to the UE and received via radio resource control (RRC) signaling.

2. The method of claim 1, wherein the measurement configuration information further includes measurement gaps required to perform inter-frequency measurement without uplink or downlink schedule.

3. The method of claim 1, wherein the measuring the s-measure associated serving cell and the at least one s-measure non-associated serving cell comprises:
performing an intra-frequency neighboring cell measurement for a frequency corresponding to any of the activated serving cells; and
performing an inter-frequency neighboring cell measurement for a second frequency excluding the frequency corresponding to any of the activated serving cells.

4. The method of claim 1, wherein a number of the s-measure value configured in the UE does not match with a number of the activated serving cells measured by the UE.

5. The method of claim 1, further comprising:
receiving a plurality of weight values from the network; and
obtaining a linear combination value indicating a reference quality of the activated serving cells by applying to plurality of weight values to a plurality of measured values of the measurement of activated serving cells, wherein a total sum of the plurality of weight is equals to '1'.

6. The method of claim 1, further comprising:
when the first measured value is greater than the s-measure value,
only measuring the s-measure associated serving cell;
comparing the measurement of the s-measure associated serving cell with the threshold for the reporting event configured in the UE; and
transmitting a measurement report when the measurement of the s-measure associated serving cell satisfies the threshold for the reporting event.

7. A user equipment (UE) comprising:
a transmitter;
a receiver; and
a processor configured to:
receive measurement configuration information including a plurality of measurement objects and a s-measure value related to a neighbor cell measurement;
measure activated serving cells indicated by the plurality of measurement objects to obtain a plurality of measurement results, the activated serving cells including a s-measure associated serving cell and at least one s-measure non-associated serving cell;
compare the s-measure value only with a first measured value from the plurality of measurement results, the first measured value being related to the s-measure associated serving cell;
when the first measured value is lower than the s-measure value, measure the s-measure associated serving cell and the at least one s-measure non-associated serving cell;
compare a measurement of the at least one s-measure non-associated serving cell from with a threshold for a reporting event configured in the UE; and
transmit a measurement report of the at least one s-measure non-associated serving cell when the measurement of the at least one s-measure non-associated serving cell satisfies the threshold for the reporting event,
wherein the s-measure value is dedicated to the UE and received via radio resource control (RRC) signaling.

8. The UE of claim 7, wherein the measurement configuration information further includes measurement gaps required to perform inter-frequency measurement without uplink or downlink schedule.

9. The UE of claim 7, wherein the processor performs an intra-frequency neighboring cell measurement for a frequency corresponding to any of the activated serving cells and performs an inter-frequency neighboring cell measurement for a second frequency excluding the frequency corresponding to any of the activated serving cells.

10. The UE of claim 7, wherein a number of the s-measure value configured in the UE does not match with a number of the activated serving cells measured by the UE.

11. The UE of claim 7,
wherein the processor is further configured to:
receives receive a plurality of weight values from the network, and
obtain a linear combination value indicating a reference quality of the activated serving cells by applying to plurality of weight values to a plurality of measured values of the measurement of the activated serving cells, and wherein a total sum of the plurality of weight is equals to '1'.

12. The UE of claim 7, wherein, when the first measured value is greater than the s-measure value, the processor is configured to:
only measure the s-measure associated serving cell;
compare the measurement of the s-measure associated serving cell with the threshold for the reporting event configured in the UE; and
transmit a measurement report when the measurement of the s-measure associated serving cell satisfies the threshold for the reporting event.

* * * * *